(12) United States Patent
Luo et al.

(10) Patent No.: US 12,561,954 B2
(45) Date of Patent: Feb. 24, 2026

(54) LIVENESS DETECTION

(71) Applicant: TENCENT TECHNOLOGY (SHENZHEN) COMPANY LIMITED, Guangdong (CN)

(72) Inventors: Wenhan Luo, Shenzhen (CN); Yaodong Wang, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 358 days.

(21) Appl. No.: 18/333,363

(22) Filed: Jun. 12, 2023

(65) Prior Publication Data

US 2023/0343071 A1      Oct. 26, 2023

Related U.S. Application Data

(63) Continuation of application No. 17/070,435, filed on Oct. 14, 2020, now Pat. No. 11,721,087, which is a
(Continued)

(30) Foreign Application Priority Data

Oct. 25, 2018    (CN) .......................... 201811250025.1

(51) Int. Cl.
   *G06V 10/764*    (2022.01)
   *G06V 10/82*    (2022.01)
   (Continued)

(52) U.S. Cl.
   CPC ............ *G06V 10/764* (2022.01); *G06V 10/82* (2022.01); *G06V 20/52* (2022.01); *G06V 40/165* (2022.01);
(Continued)

(58) Field of Classification Search
CPC .. G06V 40/168; G06V 40/172; G06V 10/764; G06V 10/82; G06V 20/52;
(Continued)

(56) References Cited

U.S. PATENT DOCUMENTS

2014/0337948 A1* 11/2014 Hoyos .............. G06Q 20/40145
                                   726/7
2017/0053156 A1* 2/2017 Chen .................... G06V 40/162
(Continued)

FOREIGN PATENT DOCUMENTS

CN      104361326 A    2/2015
CN      105184246 A   12/2015
(Continued)

OTHER PUBLICATIONS

Chakraborty et al., "Face Recognition Using Eigenvector and Principle Component Analysis", International Journal of Computer Applications, vol. 50, No. 10, Jul. 31, 2012 (8 pages).
(Continued)

*Primary Examiner* — Md K Talukder
(74) *Attorney, Agent, or Firm* — ArentFox Schiff LLP

(57) ABSTRACT

In a method for liveness detection, a plurality of images of a user is received. A plurality of facial feature points of the user in the plurality of images is obtained. For each of the plurality of images of the user, facial feature information of a facial feature of the user is determined based on positions of the plurality of facial feature points. An action is determined to be performed by the user based on changes in the facial feature information corresponding to the plurality of images. The user captured in the plurality of images is determined as a live user based on the action being determined as performed by the user.

20 Claims, 10 Drawing Sheets

Related U.S. Application Data continuation of application No. PCT/CN2019/112196, filed on Oct. 21, 2019.

(51) Int. Cl.

| | |
|---|---|
| *G06V 20/52* | (2022.01) |
| *G06V 40/16* | (2022.01) |
| *G06V 40/18* | (2022.01) |
| *G06V 40/40* | (2022.01) |

(52) U.S. Cl.
CPC .......... *G06V 40/168* (2022.01); *G06V 40/172* (2022.01); *G06V 40/193* (2022.01); *G06V 40/40* (2022.01)

(58) Field of Classification Search
CPC .... G06V 40/165; G06V 40/193; G06V 40/40; G06V 40/45
See application file for complete search history.

(56) References Cited

U.S. PATENT DOCUMENTS

| | | | |
|---|---|---|---|
| 2018/0096212 A1* | 4/2018 | Lin | G06F 16/5838 |
| 2019/0095701 A1* | 3/2019 | Li | G06T 7/13 |
| 2019/0172223 A1* | 6/2019 | Vajda | G06T 7/75 |
| 2021/0073516 A1* | 3/2021 | Luo | G06V 10/764 |
| 2021/0209346 A1* | 7/2021 | Resnick | G06V 10/454 |
| 2023/0343071 A1* | 10/2023 | Luo | G06V 40/172 |

FOREIGN PATENT DOCUMENTS

| | | |
|---|---|---|
| CN | 106897658 A | 6/2017 |
| CN | 108549873 A | 9/2018 |
| CN | 109492551 A | 3/2019 |

OTHER PUBLICATIONS

Chinese Office Action dated Jun. 29, 2022 in Application No. 201811250025.1, with Concise English Translation, pp. 1-20.

European Search Report dated Jul. 12, 2021 in Application No. 19875568.8. (11 pages).

Hongbin_xu, Python dlib learning (11): blink detection, https://blog.csdn.net/hongbin_xu/article/details/79033116, Jan. 11, 2018, with English Translation, pp. 1-14.

International Search Report issued in International Application No. PCT/CN2019/112196, dated Feb. 5, 2020 (with English abstract) (5 pgs.).

Kailun Liu, Research and Implementation of Real-time Face Recognition System in Video Surveillance, China Master's Theses Full text Database, Nov. 15, 2017, with English Abstract, pp. 1-31.

Krieg et al., "Liveness Detection in Biometrics", Proceedings of the 14th International Conference of the Biometrics Special Interest Group, Sep. 11, 2015 (8 pages).

Soukupova Tereza et al., "Real-Time Eye Blink Detection Using Facial Landmarks", Proceedings of the 21st Computer Vision Winter Workshop, Feb. 5, 2015, 8 pages.

Written Opinion of the International Searching Authority issued in International Application No. PCT/CN2019/112196 (4 pgs.).

\* cited by examiner

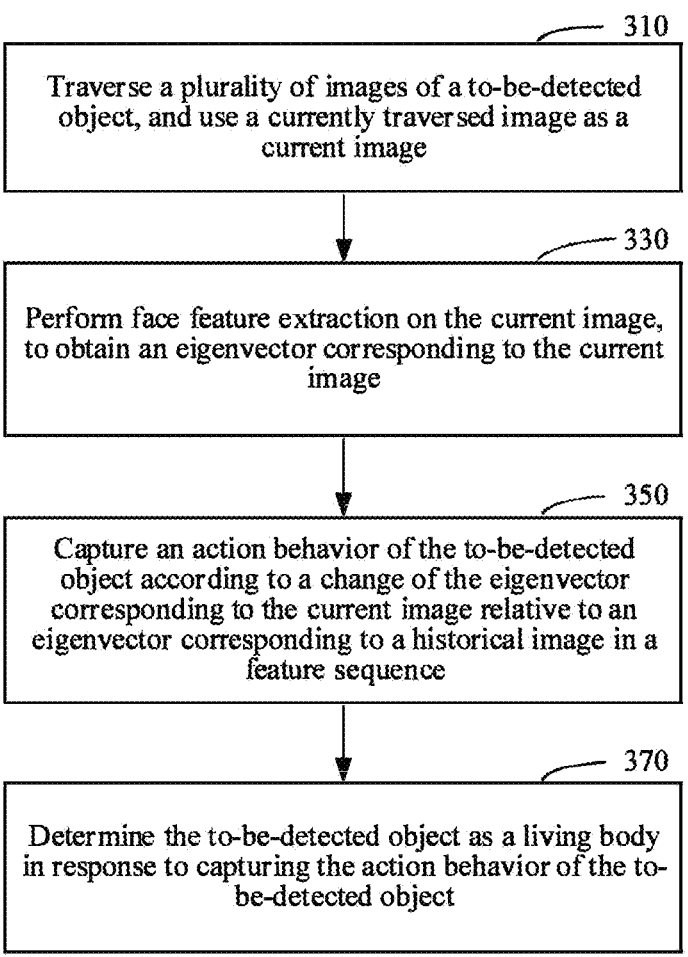

310

Traverse a plurality of images of a to-be-detected object, and use a currently traversed image as a current image

330

Perform face feature extraction on the current image, to obtain an eigenvector corresponding to the current image

350

Capture an action behavior of the to-be-detected object according to a change of the eigenvector corresponding to the current image relative to an eigenvector corresponding to a historical image in a feature sequence

370

Determine the to-be-detected object as a living body in response to capturing the action behavior of the to-be-detected object

Compare the eigenvector corresponding to the current image with a normal structure interval

430

Add the eigenvector corresponding to the current image to the feature sequence in a case that the eigenvector corresponding to the current image is within the normal structure interval

450

Ignore the eigenvector corresponding to the current image in a case that the eigenvector corresponding to the current image falls outside the normal structure interval, and continue to traverse a latter image in the plurality of images

Perform face feature recognition on the current image, to obtain several key points of the face feature in the current image

333

Calculate a structure distance proportion of the face feature according to the several key points of the face feature in the current image, to obtain the eigenvector corresponding to the current image

FIG. 4

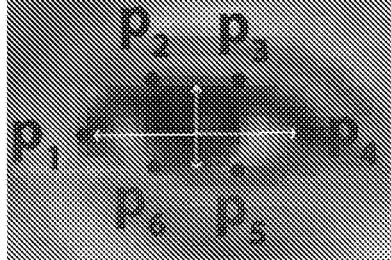

Perform grayscale processing on the current image, to obtain a grayscale image of the current image

— 3313

Input the grayscale image of the current image to a facial key point model for face feature recognition, to obtain the several key points of the face feature in the current image

FIG. 8

Control, in a case that the queue is not full, the queue to perform an enqueue operation for the eigenvector corresponding to the current image

431

Control, in a case that the queue is full, the queue to perform a dequeue operation at a queue head, and perform an enqueue operation for the eigenvector corresponding to the current image at a queue tail

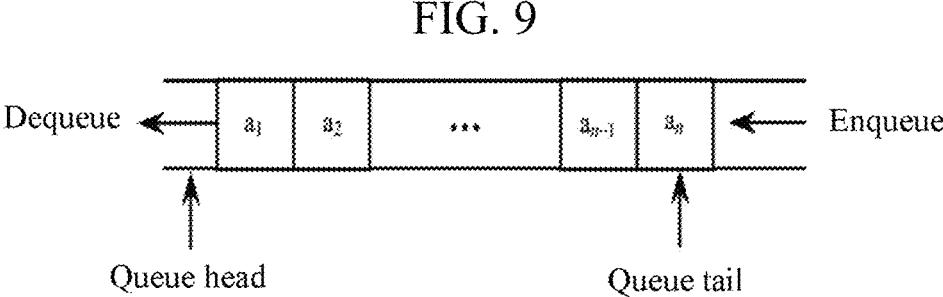

Dequeue ← | $a_1$ | $a_2$ | ••• | $a_{n-1}$ | $a_n$ | ← Enqueue

Queue head                          Queue tail

FIG. 10

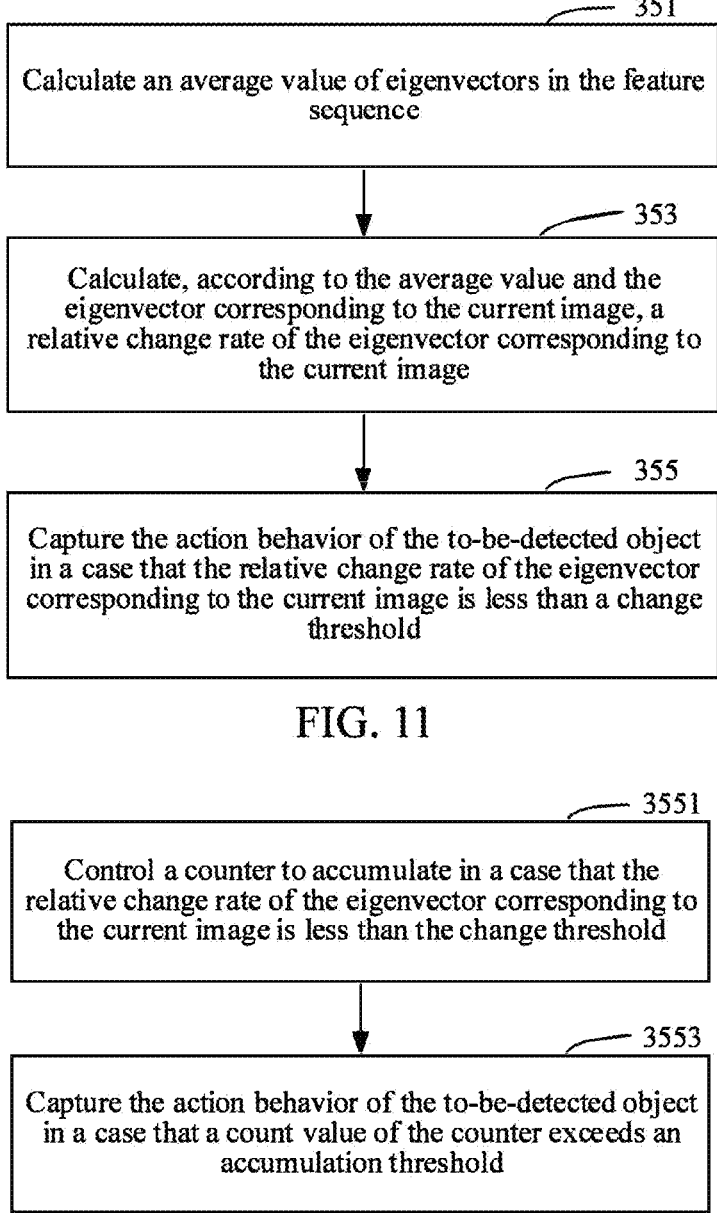

351

Calculate an average value of eigenvectors in the feature sequence

353

Calculate, according to the average value and the eigenvector corresponding to the current image, a relative change rate of the eigenvector corresponding to the current image

355

Capture the action behavior of the to-be-detected object in a case that the relative change rate of the eigenvector corresponding to the current image is less than a change threshold

Control a counter to accumulate in a case that the relative change rate of the eigenvector corresponding to the current image is less than the change threshold

3553

Capture the action behavior of the to-be-detected object in a case that a count value of the counter exceeds an accumulation threshold

Call the facial recognition model to perform facial feature extraction on the image of the to-be-detected object

373

Perform a similarity operation of a specified facial feature according to an extracted facial feature

375

Generate a recognition result of the to-be-detected object according to an operation result

900

910 Image traversal module

930 Feature extraction module

950 Behavior capture module

970 Living body detection module

1000

1001 Processor

1002

1003

Computer-readable instruction

Memory

Electronic device

LIVENESS DETECTION

RELATED APPLICATION

This application is a continuation of U.S. application Ser. No. 17/070,435, "LIVING BODY DETECTION METHOD AND APPARATUS, ELECTRONIC DEVICE, STORAGE MEDIUM, AND RELATED SYSTEM TO WHICH LIVING BODY DETECTION METHOD IS APPLIED" filed on Oct. 14, 2020, which is a continuation of International Application No. PCT/CN2019/112196, filed on Oct. 21, 2019, which claims priority to Chinese Patent Application No. 201811250025.1, "LIVING BODY DETECTION METHOD AND APPARATUS, AND RELATED SYSTEM TO WHICH LIVING BODY DETECTION METHOD IS APPLIED" filed on Oct. 25, 2018. The entire disclosures of the prior applications are hereby incorporated by reference in their entirety.

FIELD OF THE TECHNOLOGY

Embodiments of this application relate to the field of face feature recognition technologies, including a living body detection method and apparatus, an electronic device, a storage medium, and a payment system, a video surveillance system, and an access system to which the living body detection method is applied.

BACKGROUND OF THE DISCLOSURE

With the development of biometric recognition technologies, biometric recognition, such as facial recognition in face-swiping payment and video surveillance, and fingerprint recognition, and iris recognition in access authorization, has been widely applied. However, biometric recognition is subject to various threats. For example, an attacker can use a fake face, fingerprint, iris, or the like to fool biometric recognition.

SUMMARY

Embodiments of this application provide a living body detection method and apparatus, an electronic device, a storage medium, and a payment system, a video surveillance system, and an access system to which the living body detection method is applied.

An exemplary embodiment of this application provides a living body detection method that can be performed by an electronic device. The method can include traversing a plurality of images of a to-be-detected object, and using a currently traversed image as a current image, and performing face feature extraction on the current image, to obtain an eigenvector corresponding to the current image, the eigenvector being used for describing a structure of a face feature of the to-be-detected object in the current image. The method can further include capturing an action behavior of the to-be-detected object according to a change of the eigenvector corresponding to the current image relative to an eigenvector corresponding to a historical image in a feature sequence, the historical image being a traversed image in the plurality of images, and the feature sequence including an eigenvector corresponding to at least one historical image, and determining the to-be-detected object as a living body in response to capturing the action behavior of the to-be-detected object.

A further embodiment of this application provides a living body detection apparatus. The apparatus can include an image traversal module that is configured to traverse a plurality of images of a to-be-detected object, and use a currently traversed image as a current image. The apparatus can also include a feature extraction module that is configured to perform face feature extraction on the current image, to obtain an eigenvector corresponding to the current image, the eigenvector being used for describing a structure of a face feature of the to-be-detected object in the current image. Additionally, the apparatus can include a behavior capture module that is configured to capture an action behavior of the to-be-detected object according to a change of the eigenvector corresponding to the current image relative to an eigenvector corresponding to a historical image in a feature sequence, the historical image being a traversed image in the plurality of images, and the feature sequence including an eigenvector corresponding to at least one historical image, and a living body detection module, configured to determine the to-be-detected object as a living body in response to capturing the action behavior of the to-be-detected object.

An embodiment of this application provides an electronic device, including a processor and a memory, the memory storing non-transitory computer-readable instructions that, when executed by the processor, implement the living body detection method described above.

Another embodiment of this application provides a non-transitory computer-readable storage medium, storing a computer program that, when executed by a processor, implement the living body detection method described above.

An alternative embodiment of this application provides a payment system, including a payment terminal and a payment server where the payment terminal being configured to acquire a plurality of images of a payment user. The payment terminal can include a living body detection apparatus that is configured to determine corresponding eigenvectors according to the plurality of images of the payment user, capture an action behavior of the payment user according to a relative change between the determined eigenvectors, and determine the payment user as a living body in response to capturing the action behavior of the payment user. Further, the payment terminal can perform identity authentication on the payment user in a case that the payment user is a living body to initiate a payment request to the payment server in a case that the payment user passes the identity authentication.

A further embodiment of this application provides a video surveillance system, including a surveillance screen, several cameras, and a surveillance server, where the several cameras can be configured to acquire a plurality of images of a surveillance object. The surveillance server can include a living body detection apparatus that is configured to determine corresponding eigenvectors according to the plurality of images of the surveillance object, capture an action behavior of the monitored object according to a relative change between the determined eigenvectors, and determine the monitored object as a living body in response to capturing the action behavior of the surveillance object. The surveillance server perform identity recognition on the monitored object in a case that the monitored object is a living body to obtain a tracked target, and perform video surveillance on the tracked target by using a picture on the surveillance screen.

An embodiment of this application provides an access system, including a reception device, a recognition server, and an access control device, where the reception device is configured to acquire a plurality of images of an access object. The recognition server can include a living body detection apparatus that can be configured to determine corresponding eigenvectors according to the plurality of images of the access object, capture an action behavior of the access object according to a relative change between the determined eigenvectors, and determine the access object as a living body in response to capturing the action behavior of the access object. The recognition server can perform identity recognition on the access object in a case that the access object is a living body, so that the access control device configures an access permission for the access object that completes the identity recognition successfully, and the access object controls, according to the configured access permission, an access barrier of a specified work region to perform a release action.

It is to be understood that the foregoing general descriptions and the following detailed descriptions are only exemplary and explanatory, and should not be construed to limit the embodiments of this application.

BRIEF DESCRIPTION OF THE DRAWINGS

The accompanying drawings herein are incorporated in and constitute a part of the specification, illustrate embodiments of this application, and are used to explain the principle of the embodiments of this application together with the specification.

FIG. 2 is a flowchart of a living body detection method according to an exemplary embodiment.

FIG. 3 is a flowchart of another living body detection method according to an exemplary embodiment.

FIG. 4 is a flowchart of an embodiment of step 330 in the embodiment corresponding to FIG. 2.

FIG. 5 is a schematic diagram of several key points of an eye in an image involved in the embodiment corresponding to FIG. 4.

FIG. 8 is a schematic diagram of an index relationship constructed by a facial key point model involved in the embodiment corresponding to FIG. 7.

FIG. 9 is a flowchart of an embodiment of step 430 in the embodiment corresponding to FIG. 3.

FIG. 10 is a schematic diagram of a specific implementation of an enqueue operation/dequeue operation performed by a queue for an eigenvector corresponding to an image involved in the embodiment corresponding to FIG. 9.

FIG. 11 is a flowchart of an embodiment of step 350 in the embodiment corresponding to FIG. 2.

FIG. 12 is a flowchart of an embodiment of step 355 in the embodiment corresponding to FIG. 11.

4

Figures 17, 18:
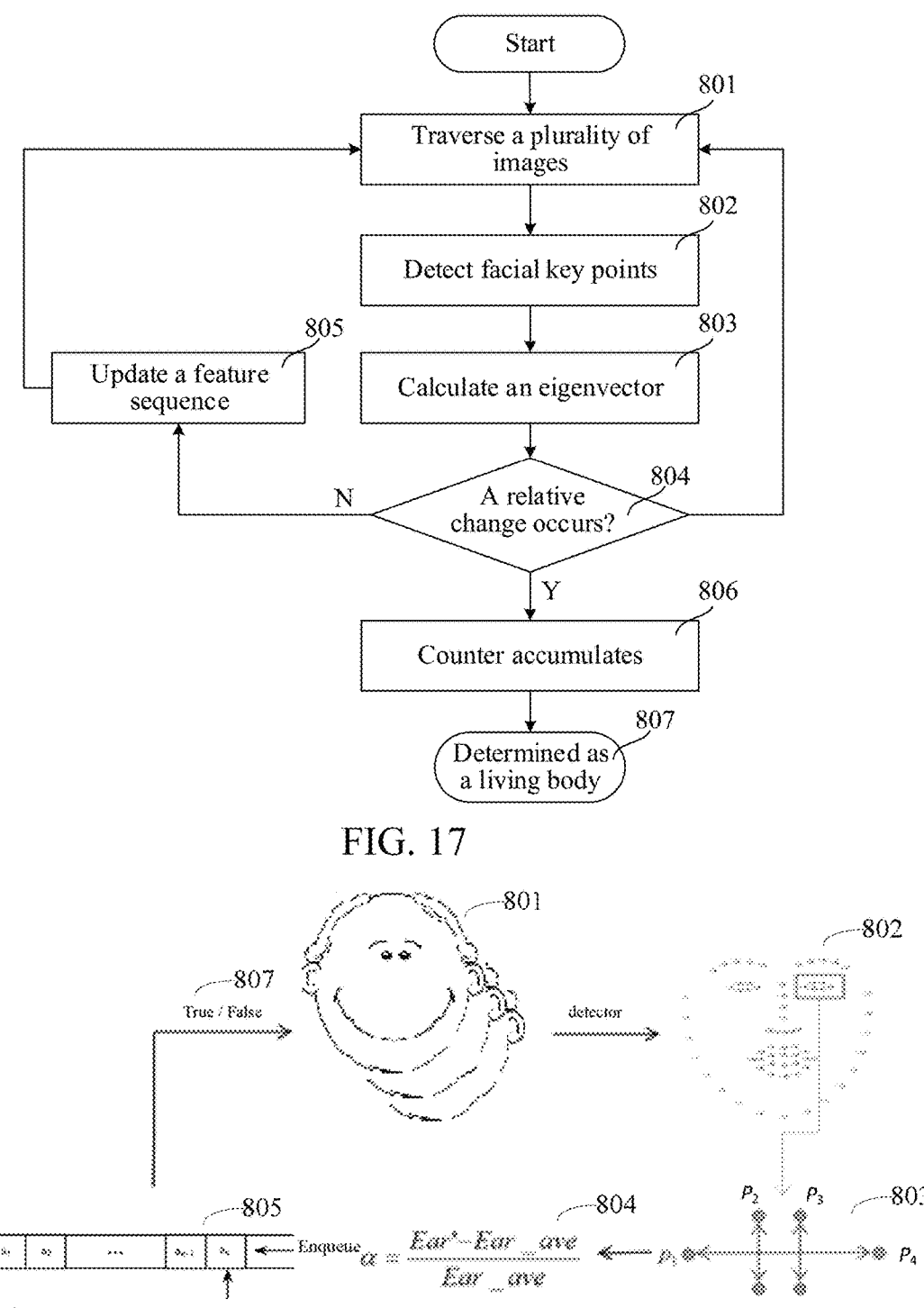

FIG. 17 is a specific sequence diagram of a living body detection method in an application scenario.

FIG. 18 is a schematic diagram of a specific implementation of a living body detection method involved in the application scenario of FIG. 17.

Figures 19, 20:
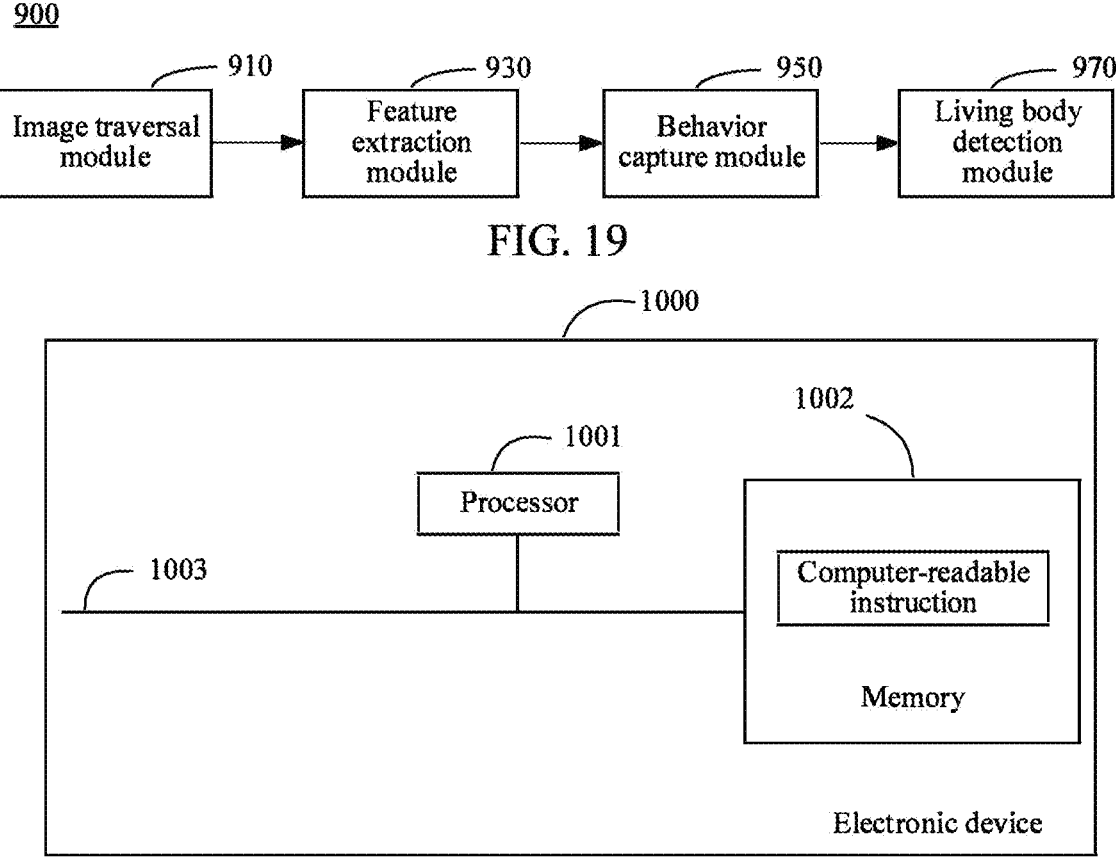

FIG. 19 is a block diagram of a living body detection apparatus according to an exemplary embodiment.

FIG. 20 is a block diagram of an electronic device according to an exemplary embodiment.

DESCRIPTION OF EMBODIMENTS

Exemplary embodiments are described in detail herein, and examples thereof are shown in the accompanying drawings. When the following descriptions are made with reference to the accompanying drawings, unless indicated otherwise, same numbers in different accompanying drawings represent the same or similar elements. The implementations described in the following exemplary embodiments do not represent all implementations that are consistent with the embodiments of this application. On the contrary, the implementations are merely examples of apparatuses and methods that are described in detail in the appended claims and that are consistent with some aspects of the embodiments of this application.

In the embodiments of this application, description is made by using an example in which a biological feature is a face feature.

A living body detection method is living body detection performed for an image of a to-be-detected object, that is, detecting whether a face feature contour of the to-be-detected object in the image changes. If it is detected that the face feature contour of the to-be-detected object in the image changes, the to-be-detected object is determined as a living body. For example, if the face feature of the to-be-detected object in the image is an eye or a mouth, when the to-be-detected object blinks or opens the mouth, the face feature contour in the image changes, so that the to-be-detected object may be determined as a living body.

A prosthesis attack sample refers to an image of a to-be-detected object stolen by an attacker. The attacker maliciously tampers with the stolen image of the to-be-detected object by using movement characteristics of an eye or a mouth. For example, an eye contour in the image is altered by using a pen, or a mouth contour in the image is covered by using a pen. As a result, the face feature contour in the image changes, leading to an illusion such as blinking or mouth opening of a prosthesis (disguised to-be-detected object, that is, the attacker), causing the prosthesis to be mistakenly determined as a living body.

Even though the living body detection method is based on a video of a to-be-detected object, because the living body detection is performed by using an image frame as a unit, an attacker may still easily crack the living body detection method by relying on a prosthesis attack sample. For example, the face feature contour in the image is rapidly covered for many times continuously, causing the prosthesis to be mistakenly determined as a living body.

As can be known from the above, the existing living body detection method still has the defect of a relatively poor defense against a prosthesis attack sample. Therefore, the embodiments of this application provide a living body detection method, and the living body detection method can effectively improve the defense against the prosthesis attack sample, and has relatively high security.

The living body detection method is implemented by a computer program, and accordingly, a constructed living body detection apparatus may be stored in an electronic device with the Von Neumann architecture, so that the living body detection method is performed in the electronic device, to further implement living body detection of a to-be-detected object. For example, the electronic device may be a smartphone, a tablet computer, a notebook computer, a desktop computer, a server, or the like, which is not limited herein.

Figure 1:
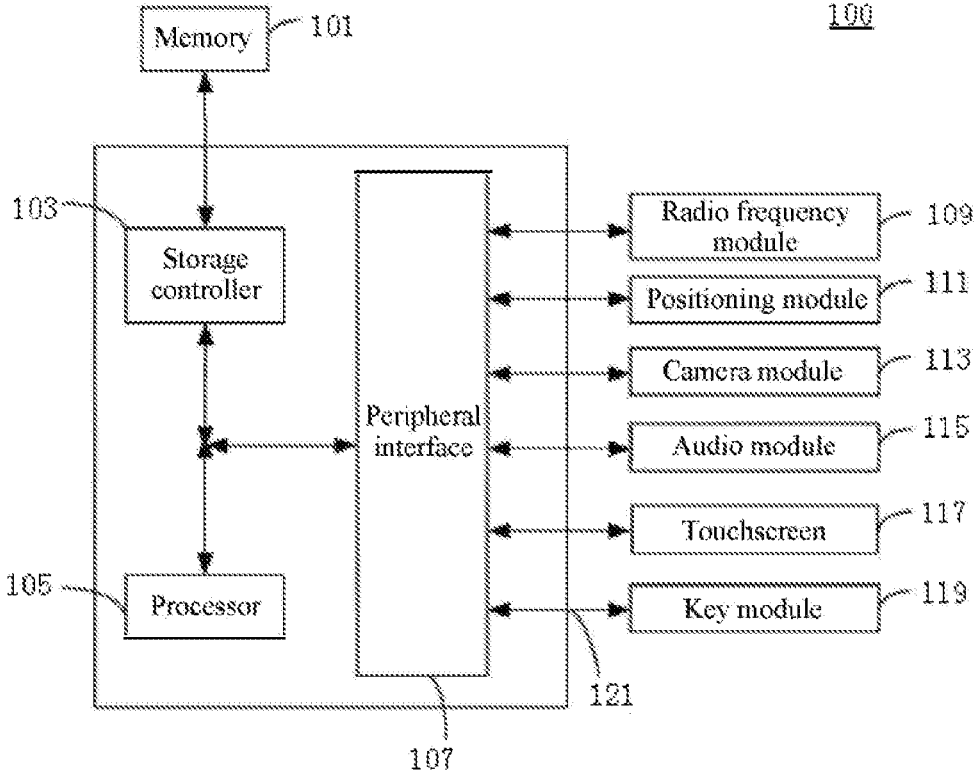
FIG. 1 is a block diagram of a hardware structure of an electronic device according to an exemplary embodiment.

FIG. 1 is a block diagram of an electronic device according to an exemplary embodiment of this application. The electronic device is merely an example adapted to the embodiments of this application, and cannot be considered as providing any limitation to a use range of the embodiments of this application. The electronic device also cannot be explained as needing to reply on or needing to have one or more components in the exemplary electronic device 100 shown in FIG. 1.

As shown in FIG. 1, the electronic device 100 includes a memory 101, a storage controller 103, one or more (only one is shown in FIG. 1) processors 105, a peripheral interface 107, a radio frequency module 109, a positioning module 111, a camera module 113, an audio module 115, a touchscreen 117, and a key module 119. These components communicate with each other by using one or more communication buses/signal lines 121. Also, it should of course be understood that one or more of the modules described in this disclosure can be implemented, for example, by processing circuitry.

The memory 101 may be configured to store a computer program and a module, for example, a computer instruction and a module corresponding to the living body detection method and apparatus in the exemplary embodiments of this application, and the processor 105 performs various functions and data processing by executing the computer program stored in the memory 101, to implement, for example, the living body detection method described in any embodiment of this application. The memory 101 is used as a carrier for resource storage, and may be a random memory such as a high-speed random access memory, a non-volatile memory such as one or more magnetic storage apparatuses, a flash memory, or another solid-state memory. The storage manner may be transient storage or permanent storage.

The peripheral interface 107 may include at least one wired or wireless network interface, at least one series-parallel conversion interface, at least one input/output interface, at least one USB interface, and the like, and is configured to couple various external input/output apparatuses to the memory 101 and the processor 105, to implement communication with the various external input/output apparatuses.

The radio frequency module 109 is configured to receive and send an electromagnetic wave, and implement mutual conversion between the electromagnetic wave and an electric signal, so as to communicate with another device by using a communication network. The communication network includes any cellular telephone network, a wireless local area network, or a metropolitan area network. The communication network may use various communication standards, protocols and technologies.

The positioning module 111 is configured to obtain a current geographical location in which the electronic device 100 is located. The positioning module 111 includes, for example, but is not limited to, the Global Positioning System (GPS) or a positioning technology based on a wireless local area network or a mobile communication network.

The camera module 113 belongs to cameras, and is configured to capture a picture or a video. The captured picture or video may be stored in the memory 101, or may be sent to a host computer by using the radio frequency module 109. For example, the camera module 113 is used to capture a to-be-detected object, to form an image of the to-be-detected object.

The audio module 115 provides an audio interface to a user, and may include one or more microphone interfaces, one or more speaker interfaces, and one or more earphone interfaces. Interaction of audio data is performed with another device by using the audio interface. Audio data may be stored in the memory 101, or may be sent by using the radio frequency module 109.

The touchscreen 117 provides an input/output interface between the electronic device 100 and the user. Specifically, the user may perform an input operation by using the touchscreen 117, such as a gesture operation like clicking, touching, and sliding, so that the electronic device 100 responds to the input operation. The electronic device 100 displays and outputs output content formed by any form of text, pictures, or videos or a combination thereof to the user by using the touchscreen 117.

The key module 119 includes at least one key, for providing an interface for the user to input information into the electronic device 100. The user may press different keys to enable the electronic device 100 to perform different functions. For example, a volume adjustment key may be used by the user to adjust the volume of sound played by the electronic device 100.

It may be understood that the structure shown in FIG. 1 is only for the purpose of illustration, and the electronic device 100 may alternatively include more or fewer components than those shown in FIG. 1, or have components different from those shown in FIG. 1. The components shown in FIG. 1 may be implemented by using hardware, software, or a combination thereof.

Referring to FIG. 2, in an exemplary embodiment of this application, a living body detection method is applicable to an electronic device. A structure of the electronic device may be shown in FIG. 1. The living body detection method may be performed by the electronic device, and may include the following steps.

In step 310, the method can traverse a plurality of images of a to-be-detected object, and use a currently traversed image as a current image. First, the plurality of images of the to-be-detected object may refer to a video, which is generated by a camera device performing video shooting on the to-be-detected object once; or may be a plurality of photos, which are generated by a camera device taking photos for the to-be-detected object continuously for many times. Alternatively, it may be understood that, living body detection may be performed based on a video of a to-be-detected object, or may be performed based on a plurality of photos of the to-be-detected object, which is not limited in this embodiment. Second, the plurality of images obtained may be a plurality of images acquired in real time, or may be a plurality of images pre-stored, that is, a plurality of images acquired by reading a historical time period in a buffer region. This is also not limited in this embodiment.

In other words, after acquiring the plurality of images of the to-be-detected object in real time, the camera device may perform living body detection on the plurality of images of the to-be-detected object in real time, or may first store the images of the to-be-detected object and process the images subsequently. For example, the images are processed when the electronic device processes fewer tasks, or processed according to indications of detection personnel.

The camera device may be a video camera, a video recorder, or another electronic device having an image acquisition function, for example, a smartphone.

The living body detection is performed by using an image frame as a unit. Therefore, after the plurality of images of the to-be-detected objects are obtained, the plurality of images of the to-be-detected object may be traversed, to perform living body detection according to traversed images. Herein, for the plurality of images of the to-be-detected object, a currently traversed image is regarded as a current image, and a traversed image is regarded as a historical image.

In step 330, the method can perform face feature extraction on the current image, to obtain an eigenvector corresponding to the current image, the eigenvector being used for describing a structure of a face feature of the to-be-detected object in the current image. The face feature of the to-be-detected object, for example, may be an eye, a mouth, an ear, or an iris. Therefore, the eigenvector corresponding to the image is used for accurately describing the structure of the face feature of the to-be-detected object in the image, and further uniquely representing the structure of the face feature of the to-be-detected object in the image on information.

It may be understood that, for different face features of the to-be-detected object, structures of the face features in images are different, so that eigenvectors corresponding to the images are also different. For example, if the face feature of the to-be-detected object is an eye, the eigenvector corresponding to the image is an eye aspect ratio, to describe the structure of the eye of the to-be-detected object in the image, and if the face feature of the to-be-detected object is a mouth, the eigenvector corresponding to the image is a mouth aspect ratio, to describe the structure of the mouth of the to-be-detected object in the image. Herein, the eigenvectors corresponding to the images are not listed one by one. Different to-be-detected objects have corresponding images, and further have eigenvectors corresponding to the corresponding images, so as to accurately describe structures of face features of the different to-be-detected objects in the corresponding images.

In step 350, the method can capture an action behavior of the to-be-detected object according to a change of the eigenvector corresponding to the current image relative to an eigenvector corresponding to a historical image in a feature sequence.

As described above, a currently traversed image is regarded as the current image, and the historical image is a traversed image in the plurality of images. Therefore, the feature sequence is generated by tracking face features of the to-be-detected object in the plurality of images, and the feature sequence includes an eigenvector corresponding to at least one historical image.

Specifically, as shown in FIG. 3, the construction process of the feature sequence includes the following steps.

In step 410, the method can compare the eigenvector corresponding to the current image with a normal structure interval.

In step 430, the method can add the eigenvector corresponding to the current image to the feature sequence in a case that the eigenvector corresponding to the current image is within the normal structure interval.

Step 450. Ignore the eigenvector corresponding to the current image in a case that the eigenvector corresponding to the current image is falls outside the normal structure interval, and continue to traverse a latter image in the plurality of images.

It is to be understood that, for the same to-be-detected object, the structure of the face feature is relatively fixed. Therefore, the structure of the face feature of the to-be-detected object in the image is also relatively fixed, and is regarded as a normal structure. For example, if the face feature of the to-be-detected object is an eye, an eye contour corresponding to a case that the eye opens is regarded as a normal structure.

The normal structure interval represents a fluctuation range of a normal structure of the face feature of the to-be-detected object in the image. The normal structure interval may be flexibly set according to an actual requirement of an application scenario. For example, in an application scenario requiring relatively high precision, a normal structure interval having a relatively narrow fluctuation range is set, which is not limited in this embodiment. Therefore, the eigenvector corresponding to the image is allowed to be added to the feature sequence only when the eigenvector is within the normal structure interval, to prevent an abnormal eigenvector from existing in the feature sequence, and fully ensure the accuracy of the feature sequence, thereby further improving the accuracy of the living body detection.

Herein, as the plurality of images of the to-be-detected object are traversed continuously, when a latter image in the plurality of images is traversed, the current image is converted into a historical image, and the traversed latter image is updated as a current image. Therefore, the feature sequence essentially reflects the normal structure of the face feature of the to-be-detected object in the historical image. Alternatively, it may be understood that, the feature sequence is used for accurately describing the normal structure of the face feature of the to-be-detected object in a historical image acquisition time period. Therefore, if the eigenvector corresponding to the current image changes relative to the eigenvector corresponding to the historical image in the feature sequence, it indicates that the structure of the face feature of the to-be-detected object in the current image changes relative to the normal structure of the face feature of the to-be-detected object described in the feature sequence in the historical image acquisition time period.

Description is made still by using an example in which the face feature of the to-be-detected object is an eye, and the normal structure is an eye contour corresponding to a case that the eye opens. Therefore, the changed structure is an eye contour corresponding to a case that the eye blinks. In this embodiment of this application, the action behavior of the to-be-detected object includes, but is not limited to a blink behavior, a mouth-open behavior, a mouth-closed behavior, a wave behavior, a stomping behavior, and the like.

As can be known from the above, for the plurality of images of the to-be-detected object, when an eigenvector corresponding to one image (current image) changes relative to eigenvectors corresponding to several previous images (historical images), it indicates that a face feature contour of the to-be-detected object in the images changes. For example, the to-be-detected object blinks. In this case, it is regarded that an action behavior of the to-be-detected object is captured, thereby determining the to-be-detected object as a living body.

In step 370, the method can determine the to-be-detected object as a living body in response to capturing the action behavior of the to-be-detected object. For example, when a blink behavior, a mouth-open behavior, a mouth-closed behavior, a wave behavior, a stomping behavior, or the like of the to-be-detected object is captured, the to-be-detected object may be determined as a living body.

Through the foregoing process, a living body detection solution based on a relative change of an eigenvector is implemented. That is, for the plurality of images of the to-be-detected object, the to-be-detected object is determined as a living body only when an eigenvector corresponding to one image changes relative to eigenvectors corresponding to several previous images, to filter mistaken determining of a prosthesis caused by an abrupt change of a face feature contour in a prosthesis attack sample, thereby effectively improving the defense of the living body detection method against the prosthesis attack sample, and having relatively high security.

Referring to FIG. 4, in an exemplary embodiment of this application, step 330 may include the following steps.

In step 331, the method can perform face feature recognition on the current image, to obtain several key points of the face feature in the current image.

As described above, the eigenvector is used for describing the structure of the face feature of the to-be-detected object in the image, and the structure of the face feature in the image essentially refers to a face feature contour in the image. For example, if the face feature of the to-be-detected object is an eye, the structure of the eye of the to-be-detected object in the image refers to an eye contour in the image. It may be understood that, the face feature contour in the image may be regarded to be formed by a series of pixels. During calculation of the eigenvector, it is unnecessary to use all pixels forming the face feature contour in the image. Therefore, in this embodiment, through the face feature recognition, several key points of the face feature in the image are obtained. Alternatively, it may be understood that, the several key points of the face feature in the image are used for representing several key pixels forming the face feature contour in the image.

Description is made still by using an example in which the face feature of the to-be-detected object is an eye. As shown in FIG. 5, six key points of an eye in an image separately include: one key pixel P1 of the right canthus, two key pixels P2 and P3 of the upper eyelid, one key pixel P4 of the left canthus, and two key pixels P5 and P6 of the lower eyelid.

In this embodiment of this application, the several key points of the face feature in the image are uniquely represented by different coordinates (x, y). Further, in this embodiment of this application, the face feature recognition may be implemented in different manners according to different types of to-be-detected objects. In an embodiment of this application, when the to-be-detected object is a person, the face feature recognition may be implemented by using a facial key point model. That is, the facial key point model is called to extract the several key points of the face feature in the image.

In step 333, the method can calculate a structure distance proportion of the face feature according to the several key points of the face feature in the current image, to obtain the eigenvector corresponding to the current image. As described above, if the face feature of the to-be-detected object is an eye, the eigenvector corresponding to the image is an eye aspect ratio, to describe the structure of the eye of the to-be-detected object in the image, and if the face feature of the to-be-detected object is a mouth, the eigenvector corresponding to the image is a mouth aspect ratio, to describe the structure of the mouth of the to-be-detected object in the image. The eye aspect ratio represents a structure distance proportion of an eye, and the mouth aspect ratio represents a structure distance proportion of a mouth.

Description is made still by using an example in which the face feature of the to-be-detected object is an eye. As shown in FIG. 5, the eye contour in the image may be basically located by using the six key points of the eye in the image, to further reflect the structure of the eye in the image. Specifically, a calculation formula of the eye aspect ratio is shown in (1):

$$EAR = \frac{\|p_2 - p_6\| + \|p_3 - p_5\|}{2\|p_1 - p_4\|}, \tag{1}$$

where EAR represents the eye aspect ratio, $p_1$ represents coordinates of the key pixel of the right canthus, $p_2$ and $p_3$ separately represent coordinates of the two key pixels of the upper eyelid, $p_4$ represents coordinates of the key pixel of the left canthus, and $p_5$ and $p_6$ separately represent coordinates of the two key pixels of the lower eyelid.

Further, $\|p1-p4\|$ represents a norm of a coordinate difference between a pair of key pixels of the left and right canthi, likewise, $\|p2-p6\|$ represents a norm of a coordinate difference between a pair of key pixels of the upper and lower eyelids, and $\|p3-p5\|$ represents a norm of a coordinate difference between the other pair of key pixels of the upper and lower eyelids.

In the calculation formula (1), the numerator represents a vertical distance between the upper and lower eyelids of the eye, and the denominator represents a horizontal distance between the left and right canthi of the eye. The numerator includes two sets of vertical distances, and the denominator includes one set of horizontal distances. Therefore, the denominator is weighted, that is, multiplied by 2.

Herein, with reference to the calculation formula (1), the principle of capturing the blink behavior of the to-be-detected object by using the eye aspect ratio is described.

Figures 6, 7:
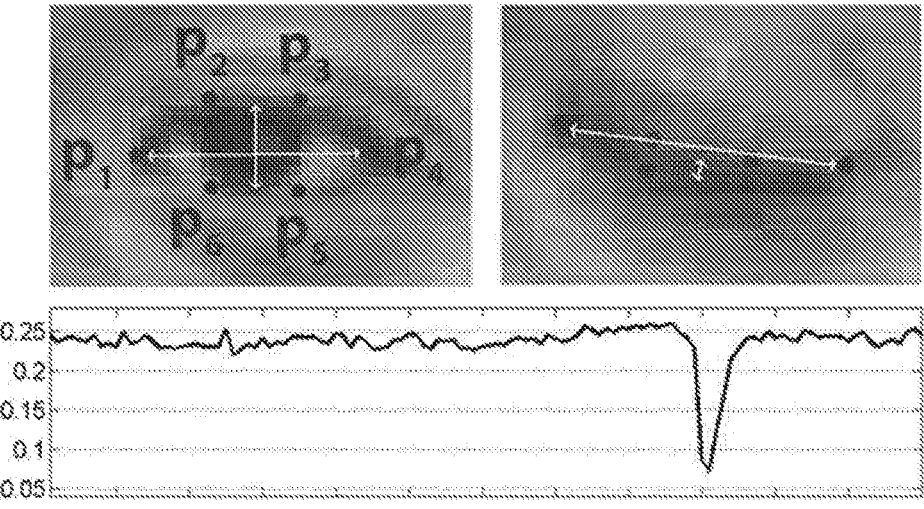
FIG. 6 is a schematic diagram of a change trend of an eye aspect ratio involved in the embodiment corresponding to FIG. 4.
FIG. 7 is a flowchart of an embodiment of step 331 in the embodiment corresponding to FIG. 4.

As shown in FIG. 6, when the eye opens, the eye aspect ratio is roughly constant, and only fluctuates around the range 0.25. Once the eye blinks and closes, because the vertical distance is almost zero, the eye aspect ratio is correspondingly reduced to zero. When the eye opens again, the eye aspect ratio rises to the range 0.25 again. Therefore, it may indicate that the eye blinks once.

Based on the foregoing embodiments, the structure of the face feature in the image is accurately described, to provide a basis for subsequently detecting whether the to-be-detected object has an action behavior, so that the living body detection can be implemented.

Further, referring to FIG. 7, in an exemplary embodiment of this application, the face feature in the current image is a facial feature. The facial feature includes, but is not limited to: an eyebrow, an eye, a nose, a mouth, an ear, and the like.

Correspondingly, step 331 may include the following steps.

In step 3311, the method can perform grayscale processing on the current image, to obtain a grayscale image of the current image.

In step 3313, the method can input the grayscale image of the current image into a facial key point model for face feature recognition, to obtain the several key points of the face feature in the current image. The facial key point model essentially constructs an index relationship for the facial feature in the image, so that several key points of a specific facial feature can be extracted from the image by using the constructed index relationship. Specifically, after the image of the to-be-detected object is inputted into the facial key point model, the several key points of the facial feature in the image are marked with indexes. For example, as shown in FIG. 8, indexes marked by six key points of left and right eyes in the image are 37 to 42 and 43 to 48 respectively, and indexes marked by 20 key points of a mouth are 49 to 68.

In addition, coordinates of the several key points of the facial feature marked with indexes in the image are correspondingly stored, to construct an index relationship between the indexes and the coordinates for the facial feature in the image. Therefore, the coordinates of the several key points of the facial feature in the image may be obtained by using the indexes based on the index relationship.

In an embodiment of this application, the facial key point model is generated by performing model training on a specified mathematic model by using massive image samples. The image sample refers to an image marked with an index. The model training is essentially performing iterative optimization on parameters of the specified mathematic model, so that a specified algorithm function constructed by the parameters meets a convergence condition. The specified mathematic model includes, but is not limited to, a machine learning model such as logistic regression, a support vector machine, a random forest, and a neural network. The specified algorithm function includes, but is not limited to, a maximum expectation function, a loss function, and the like.

For example, the parameters of the specified mathematic model are randomly initialized, and a loss value of a loss function constructed by the randomly initialized parameters is calculated according to a current image sample.

If the loss value of the loss function does not reach a minimum value, the parameters of the specified mathematic model are updated, and a loss value of a loss function constructed by the updated parameters is calculated according to a latter image sample.

The iteration loops in this way until the loss value of the loss function reaches the minimum value. In this case, it is regarded that the loss function converges, so that the specified mathematic model converges as a facial key point model, and the iteration stops. Otherwise, the parameters of the specified mathematic model are iteratively updated, and a loss value of a loss function constructed by the updated parameters is iteratively calculated according to rest image samples, until the loss function converges.

It is worth mentioning that, if before the loss function converges, the quantity of times of iterations has reached an iterative threshold, and the iteration also stops, to ensure the model training efficiency.

As can be known from the above, the facial key point model that completes the model training may be used to rapidly obtain several key points of the facial feature in the image, to fully ensure the timeliness of the living body detection. In addition, based on the facial key point model, the facial feature recognition for different facial expressions has good accuracy and stability, to provide an accurate basis for the subsequent living body detection.

Referring to FIG. 9, in an exemplary embodiment of this application, the feature sequence is a queue of a specified length.

Correspondingly, step 430 may include the following steps.

In step 431, the method can control, in a case that the queue is not full, the queue to perform an enqueue operation for the eigenvector corresponding to the current image.

In step 433, the method can control, in a case that the queue is full, the queue to perform a dequeue operation at a queue head, and perform an enqueue operation for the eigenvector corresponding to the current image at a queue tail.

As shown in FIG. 10, a queue of a specified length N includes N storage positions, and each storage position may be used for storing an eigenvector meeting a normal structure interval. The specified length of the queue may be flexibly adjusted according to an actual requirement of an application scenario. For example, for an application scenario requiring relatively high precision, if more images of the to-be-detected object are traversed, a larger specified length is set; and for an application scenario with a relatively high requirement of a storage space of an electronic device, a relatively small specified length is set. Of course, it should be understood that this is not limited in this embodiment.

Assuming that there are 2n images of the to-be-detected object, an eigenvector corresponding to each image is $a_i$, where $1 \le i \le 2n$.

When the queue is empty, if the first eigenvector $a_1$ meets the normal structure interval, the eigenvector $a_1$ is stored to the first storage position in the queue. When the queue is not full, if the second eigenvector $a_2$ meets the normal structure interval, the eigenvector $a_2$ is stored to the second storage position in the queue.

By analogy, if an $N^{th}$ eigenvector an meets the normal structure interval, the eigenvector $a_n$ is stored to an $N^{th}$ storage position in the queue, and in this case, the queue is full. When the queue is full, if an (N+1)th eigenvector $a_{n+1}$ meets the normal structure interval, to uphold the "first-in first-out" principle, the first eigenvector $a_1$ is moved out of the queue from the queue head, and the second eigenvector $a_2$ is moved to the first storage position along a queue head direction. By analogy, an $N^{th}$ eigenvector an is moved to an (N−1)th storage position along the queue head direction, thereby completing the dequeue operation.

In this case, if the $N^{th}$ storage position in the queue is empty, the (N+1)th eigenvector $a_{n+1}$ is stored to the $N^{th}$ storage position from the queue tail, thereby completing the enqueue operation.

As can be known from the above, as the images of the to-be-detected object are continuously acquired, due to the limited storage positions in the queue, the eigenvectors stored in the queue are updated accordingly in real time, to achieve a sliding window filtering effect, and fully ensure the accuracy of a normal structure of a face feature of the to-be-detected object described in the queue in the historical image acquisition time period.

Based on the foregoing embodiments, the living body detection method based on a queue is implemented, which not only can effectively filter mistakenly determining a prosthesis as a living body caused by an abrupt change of a face feature structure in a prosthesis attack sample, but also can be applied to groups with different facial features. That is, eigenvectors in different queues may reflect normal structures of different facial features, so that the living body detection method has good adaptability and universality.

Referring to FIG. 11, in an exemplary embodiment of this application, step 350 may include the following steps.

In step 351, the method can calculate an average value of eigenvectors in the feature sequence.

In step 353, the method can calculate, according to the average value and the eigenvector corresponding to the current image, a relative change rate of the eigenvector corresponding to the current image.

By using an eye aspect ratio as an example, as shown in FIG. 6, when the eye blinks, the eye aspect ratio jumps obviously. That is, whether the eye blinks is determined by recording a change trend of the eye aspect ratio in the historical image acquisition time period. Specifically, a determining threshold is set to 0.15, and when the eye aspect ratio is less than 0.15, it is regarded that one blink behavior of the to-be-detected object is captured.

Herein, the determining threshold may be flexibly set according to an actual requirement of an application scenario. For example, a relatively large determining threshold is set for an application scenario requiring relatively high detection sensitivity, which is not limited in this embodiment.

It may be understood that, for a living body, an action behavior of the living body may be captured sensitively by using the eye aspect ratio. However, if an attacker rapidly covers an eye contour in the image continuously for many times, because several key points of the eye in the image are damaged, a case that the eye aspect ratio is less than the determining threshold is easily caused. As a result, a prosthesis is mistakenly determined as a living body.

In addition, another case exists in the mistaken determining, that is, a living body is mistakenly determined as a prosthesis.

For the image of the to-be-detected object, if the eye itself in the image is relatively small, a probability that the eye aspect ratio jumps obviously is greatly reduced. An extreme case may further occur when the to-be-detected object opens eyes, the eye aspect ratio corresponding to the image is already less than the determining threshold, causing a failure in detecting the obvious jump of the eye aspect ratio during the blinking of the to-be-detected object, and a living body to be mistakenly determined as a prosthesis.

Therefore, in this embodiment, the living body detection method is implemented according to the relative change of the face feature structure of the to-be-detected object in the image, as shown in the following formula (2):

$$\alpha = \frac{Ear' - \text{Ear\_ave}}{\text{Ear\_ave}}, \qquad (2)$$

where $\alpha$ represents a relative change rate of an eigenvector corresponding to a current image, Ear\_ave represents an average value of eigenvectors in a feature sequence, and Ear' represents the eigenvector corresponding to the current image. That is, Ear\_ave is used for reflecting the normal structure of the face feature of the to-be-detected object in a historical image acquisition time period. Further, Ear' is used for reflecting the structure of the face feature of the to-be-detected object in a current image acquisition time period.

Because the historical image acquisition time period and the current image acquisition time period are continuous, if the relative change rate $\alpha$ is not zero, it indicates that in the same time period in which a to-be-detected image is acquired, and the structure of the face feature reflected by Ear' changes relative to the normal structure of the face feature reflected by Ear\_ave. Therefore, the to-be-detected object may have an action behavior.

In step 355, the method can capture the action behavior of the to-be-detected object in a case that the relative change rate of the eigenvector corresponding to the current image is less than a change threshold.

As described above, when the relative change rate a is not zero, the to-be-detected object may have an action behavior. Therefore, in this embodiment, the change threshold is set, that is, it is regarded that the action behavior of the to-bedetected object is captured only when the relative change rate $\alpha$ is less than the set change threshold. Herein, the change threshold may be flexibly set according to an actual requirement of an application scenario. For example, a relatively large change threshold is set for an application scenario requiring relatively high detection sensitivity, which is not limited in this embodiment.

In the foregoing process, determining by a relative change is replaced with determining by an absolute change, to avoid the defect that the living body is mistakenly determined as a prosthesis caused by different action behavior amplitudes of different structures of face features, for example, a blink amplitude of a small eye is less than a blink amplitude of a large eye, thereby enhancing the robustness and stability of the living body detection.

Further, referring to FIG. 12, in an exemplary embodiment of this application, step 355 may include the following steps.

In step 3551, the method can control a counter to accumulate in a case that the relative change rate of the eigenvector corresponding to the current image is less than the change threshold.

In step 3553, the method can capture the action behavior of the to-be-detected object in a case that a count value of the counter exceeds an accumulation threshold.

It may be understood that, during image acquisition of the to-be-detected object, the to-be-detected object may close eyes during photo shooting, but not actually blink. Therefore, in this embodiment, a counter and an accumulation threshold are set, and it is regarded that the to-be-detected object has an action behavior only when a count value accumulated in the counter exceeds the accumulation threshold.

In conjunction with the foregoing embodiments, the possibility of mistaken detection caused by a change of a face feature structure of the image itself is further ruled out.

In an exemplary embodiment of this application, after step 370, the method may further include the following step of calling, in a case that the to-be-detected object is a living body, a facial recognition model to perform facial recognition on an image of the to-be-detected object.

Figures 13, 14:
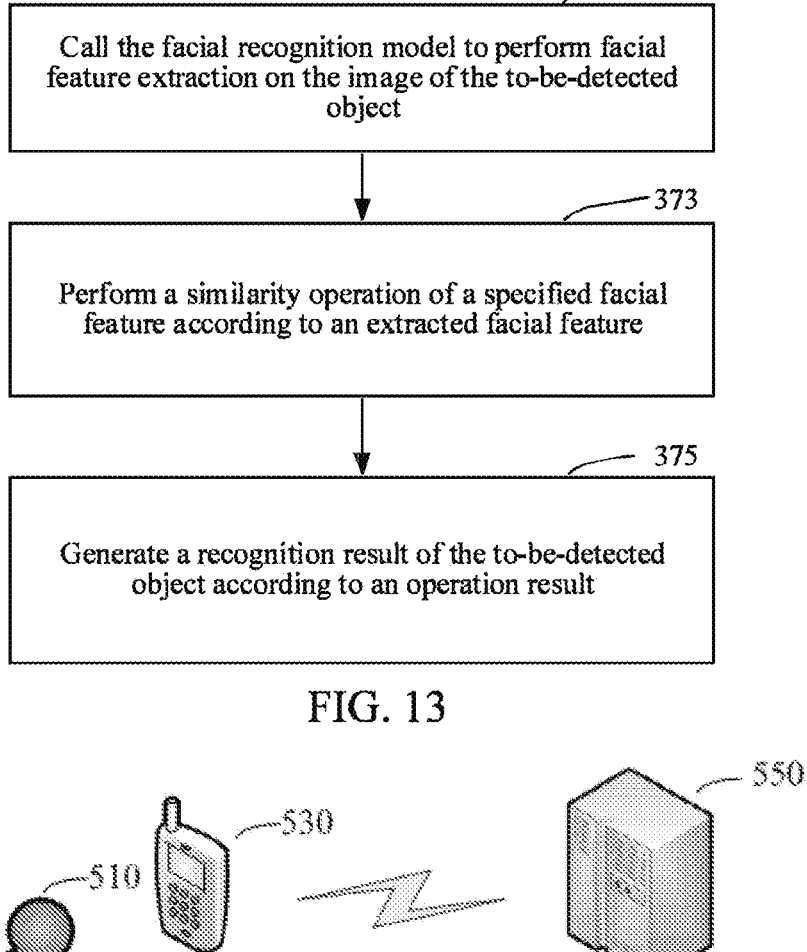
FIG. 13 is a flowchart of an embodiment of step 370 in the embodiment corresponding to FIG. 2.
FIG. 14 is a schematic diagram of an implementation environment based on identity authentication in an application scenario.

Specifically, as shown in FIG. 13, the facial recognition process may include the following steps.

In step 371, the method can call the facial recognition model to perform facial feature extraction on the image of the to-be-detected object. In this embodiment, the facial recognition model is generated by performing model training based on a convolutional neural network model. Therefore, after the image of the to-be-detected object is inputted into the facial recognition model, a model output can be obtained by using forward propagation of the facial recognition model. That is, a facial feature of the image of the to-be-detected object is extracted.

In step 373, the method can perform a similarity operation of a specified facial feature according to the extracted facial feature. First, the specified facial feature is obtained by performing facial feature extraction on an image of specified personnel based on the facial recognition model. Herein, the specified personnel may be a person that needs to be access-authorized in a building, or may be a target that needs to be tracked by a security department, or may be a person in a bank whose identity needs to be authenticated. The type of the specified personnel is not specifically limited in this embodiment.

Correspondingly, specified personnel of different types may correspond to different application scenarios. The application scenarios include, but are not limited to: an access authorization scenario, a video surveillance scenario, a face swiping payment scenario, and the like. Therefore, the facial recognition method provided in this embodiment may be applied to different application scenarios according to the different types of specified personnel. Further, because the identity of the specified personnel is known, after the specified facial feature is extracted, an association relationship between the specified facial feature and the known identity can be established for the specified personnel, for identity association for the specified facial feature subsequently.

Second, the similarity operation is calculating a similarity between the facial feature of the image of the to-be-detected object and the specified facial feature. A higher similarity indicates that the facial feature of the image of the to-be-detected object is more similar to the specified facial feature, or may be understood as a higher possibility that the identity of the to-be-detected object is an identity associated with the specified facial feature. On the contrary, the possibility is lower. The association relationship between the specified facial feature and identity is pre-established for the specified personnel with the known identity in the specified facial feature extraction process, to further facilitate identity association performed on the specified facial feature.

In step 375, the method can generate a recognition result of the to-be-detected object according to a similarity operation result. In one-to-one or many-to-one feature matching, for example, the identity authentication, the operation result is used for indicating the similarity between the facial feature of the image of the to-be-detected object and the specified facial feature.

When the similarity is less than a similarity threshold, it indicates that the identity of the to-be-detected object is different from the identity of the specified personnel, and the recognition result indicates that the to-be-detected object does not pass the authentication of the identity associated with the specified facial feature. In this case, the identity authentication for the to-be-detected object is regarded to be failed.

On the contrary, when the similarity is greater than the similarity threshold, it indicates that the identity of the to-be-detected object is the same as the identity of the specified personnel, and the recognition result indicates that the to-be-detected object passes the authentication of the identity associated with the specified facial feature. In this case, the identity authentication for the to-be-detected object is regarded to be successful.

Further, in one-to-many feature matching, for example, the identity recognition, the operation result is used for indicating respective similarities between the facial feature of the image of the to-be-detected object and a plurality of specified facial features. That is, the operation result is a set of a plurality of similarities, and each similarity corresponds to a specified facial feature.

Therefore, a specified facial feature with a highest similarity is regarded as a facial feature description of specified personnel obtained through the identity recognition, so that the identity of the specified personnel associated with the specified facial feature with the highest similarity can be obtained according to the association relationship between the specified facial feature and the identity, to further determine the identity of the specified personnel as the identity of the to-be-detected object.

Based on the foregoing embodiments, the facial recognition process is implemented, and may be applied to application scenarios requiring identity authentication/identity recognition.

FIG. 14 is a schematic diagram of an implementation environment based on identity authentication in an application scenario. As shown in FIG. 14, in the application scenario, the implementation environment includes a payment user 510, a smartphone 530, and a payment server 550.

For a to-be-paid order, the payment user 510 performs face swiping by using a camera configured in the smartphone 530, so that the smartphone 530 obtains a to-be-recognized user image corresponding to the payment user 510, and further performs facial recognition on the to-be-recognized user image by using a facial recognition model. Specifically, a user feature of the to-be-recognized user image is extracted by using the facial recognition model, and a similarity between the user feature and a specified user feature is calculated. If the similarity is greater than a similarity threshold, the payment user 510 passes identity authentication. The specified user feature is pre-extracted for the payment user 510 by the smartphone 530 by using the facial recognition model. After the payment user 510 passes the identity authentication, the smartphone 530 initiates an order payment request to the payment server 550 for the to-be-paid order, to complete a payment process of the to-be-paid order.

Figure 15:
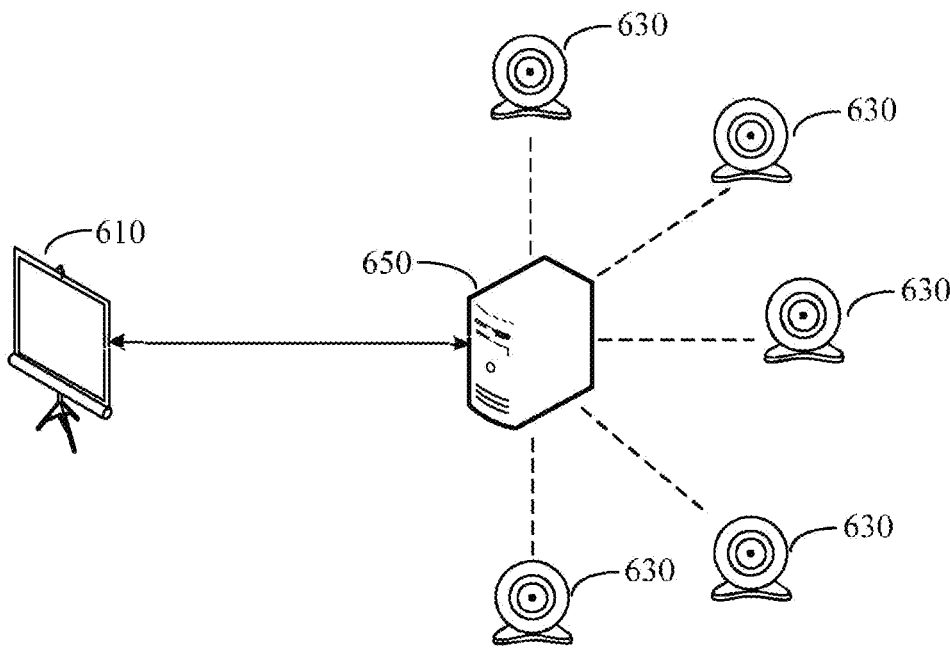
FIG. 15 is a schematic diagram of an implementation environment based on identity recognition in an application scenario.

FIG. 15 is a schematic diagram of an implementation environment based on identity recognition in an application scenario. For example, in video surveillance, through identity recognition, a tracked target is determined in a plurality of facial images displayed on pictures. Many-to-one feature matching is implemented in the application scenario, and may be regarded as a special case of one-to-one feature matching.

As shown in FIG. 15, in the application scenario, the implementation environment includes a surveillance screen 610, cameras 630 distributed everywhere, and a surveillance server 650 for implementing interactions between the cameras 630 and the surveillance screen 610.

In the application scenario, a large quantity of cameras 630 are distributed indoors and outdoors, so as to implement video surveillance at any time by using pictures acquired by the camera 630. Specifically, the large quantity of distributed cameras 630 form a video surveillance system, and pictures are obtained through interactions between the surveillance server 650 and the cameras 630 in the video surveillance system, to further implement video surveillance for the tracked target in the surveillance screen 610 by using the pictures.

Facial recognition of a monitored object in a picture to determine a tracked target is completed by the surveillance server 650. Specifically, facial features of a plurality of facial images in the pictures are extracted by using the facial recognition model, and similarities between the facial features and a specified target feature are calculated separately. The specified target feature is pre-extracted based on the tracked target by using the facial recognition model. Therefore, a facial feature with a highest similarity that exceeds a similarity threshold can be obtained, and further an identity of the monitored object is determined as an identity associated with the facial feature with the highest similarity that exceeds the similarity threshold, to recognize the tracked target in the pictures, to facilitate continuous tracking for the tracked target subsequently.

Because not all pictures have the tracked target, for the facial feature with the highest similarity, similarities need to be compared to ensure the accuracy of the continuous tracking.

Figure 16:
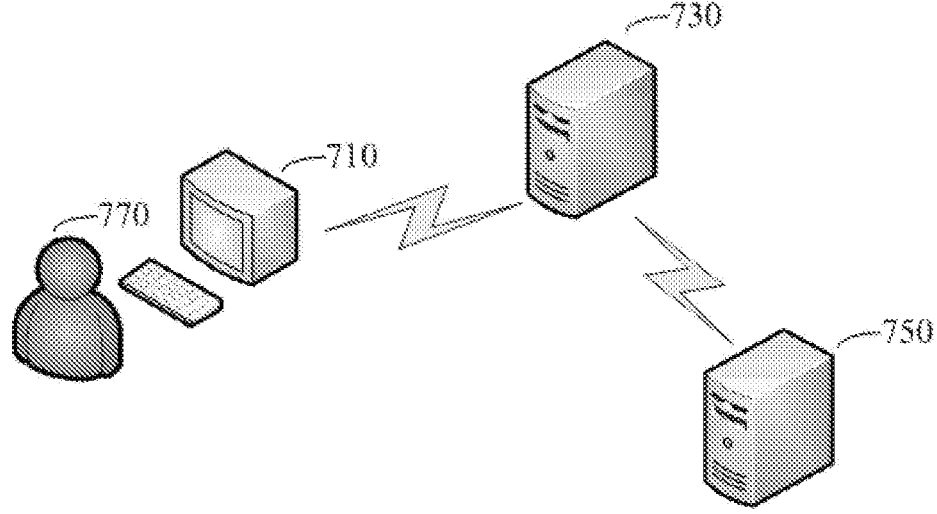
FIG. 16 is a schematic diagram of another implementation environment based on identity recognition in an application scenario.

FIG. 16 is a schematic diagram of another implementation environment based on identity recognition in an application scenario. As shown in FIG. 16, the implementation environment includes a reception device 710, a recognition server 730, and an access control device 750.

A camera is installed on the reception device 710, to take facial photos of an access object 770, and send an obtained to-be-recognized personnel image of the access object 770 to the recognition server 730 for facial recognition. In the application scenario, the access object 770 includes work personnel and a visitor.

The recognition server 730 extracts a personnel feature of the to-be-recognized personnel image by using the facial recognition model, calculates similarities between the personnel feature and a plurality of specified personnel features, to obtain a specified personnel feature with a highest similarity, and further determines a personnel identity associated with the specified personnel feature with the highest similarity as an identity of the access object 770, to complete identity recognition of the access object 770. The specified personnel feature is pre-extracted by the recognition server 730 for the access object 770 by using the facial recognition model.

After the identity recognition of the access object 770 is completed, the recognition server 730 sends an access authorization instruction to the access control device 750 for the access object 770, so that the access control device 750 configures a corresponding access permission for the access object 770 according to the access authorization instruction, and further the access object 770 controls an access barrier of a specified work region by using the access permission, to perform a release action.

Certainly, in different application scenarios, flexible deployment may be performed according to an actual application requirement. For example, the recognition server 730 and the access control device 750 may be deployed as one server, or the reception device 710 and the access control device 750 are deployed on one server, which is not limited in the application scenario.

In the foregoing three application scenarios, the living body detection apparatus may be used as a precursor module of identity authentication/identity recognition.

As shown in FIG. 17 and FIG. 18, by performing step 801 to step 807, the living body detection apparatus can accurately determine whether the to-be-detected object is a living body, and further filter a prosthesis attack sample, which not only can fully provide security of the identity authentication/identity recognition, but also can effectively relieve work pressure and traffic pressure of the facial recognition model, thereby better providing convenience for various facial recognition tasks.

In addition, the computer program volume involved in the living body detection apparatus is light, and hardware configuration requirements for the electronic device are simple. The apparatus is not only applicable to a smartphone, but also applicable to a server configured with a Windows operating system and a Linux operating system, thereby fully improving the universality and practicality of the living body detection method.

The following is an apparatus embodiment in this application. The apparatus may be configured to perform the living body detection method in any embodiment of this application. For details not disclosed in the apparatus embodiment in this application, refer to the method embodiment of the living body detection method in this application.

Referring to FIG. 19, in an exemplary embodiment of this application, a living body detection apparatus 900 includes, but is not limited to: an image traversal module 910, a feature extraction module 930, a behavior capture module 950, and a living body detection module 970.

The image traversal module 910 is configured to traverse a plurality of images of a to-be-detected object, and use a currently traversed image as a current image.

The feature extraction module 930 is configured to perform face feature extraction on the current image to obtain an eigenvector corresponding to the current image, the eigenvector being used for describing a structure of a face feature of the to-be-detected object in the current image.

The behavior capture module 950 is configured to capture an action behavior of the to-be-detected object according to a change of the eigenvector corresponding to the current image relative to an eigenvector corresponding to a historical image in a feature sequence, the historical image being a traversed image in the plurality of images, and the feature sequence including an eigenvector corresponding to at least one historical image.

The living body detection module 970 is configured to determine the to-be-detected object as a living body in response to capturing the action behavior of the to-be-detected object.

In an exemplary embodiment, the feature extraction module can include an image recognition unit that is configured to perform face feature recognition on the current image to obtain several key points of the face feature in the current image, and a feature calculation unit that is configured to calculate a structure distance proportion of the face feature according to the several key points of the face feature in the current image, to obtain the eigenvector corresponding to the current image.

In another exemplary embodiment, the face feature in the current image is a facial feature, and the image recognition unit can include a grayscale processing subunit that is configured to perform grayscale processing on the current image, to obtain a grayscale image of the current image, and a model calling subunit that is configured to input the grayscale image of the current image into a facial key point model to perform face feature recognition to obtain the several key points of the face feature in the current image.

In an exemplary embodiment, the face feature in the current image includes an eye and/or a mouth, and the eigenvector corresponding to the current image includes an eye aspect ratio and/or a mouth aspect ratio.

In an exemplary embodiment, the apparatus further includes: a vector comparison module that is configured to compare the eigenvector corresponding to the current image with a normal structure interval, and a vector adding module that is configured to add the eigenvector corresponding to the current image to the feature sequence in a case that the eigenvector corresponding to the current image is within the normal structure interval.

In a further exemplary embodiment, the feature sequence is a queue of a specified length, and the vector adding module includes a first enqueue unit that is configured to control, in a case that the queue is not full, the queue to perform an enqueue operation for the eigenvector corresponding to the current image, and a second enqueue unit that is configured to control, in a case that the queue is full, the queue to perform a dequeue operation at a queue head, and perform an enqueue operation for the eigenvector corresponding to the current image at a queue tail.

In an exemplary embodiment, the behavior capture module includes an average value calculation unit that is configured to calculate an average value of eigenvectors in the feature sequence, a change rate calculation unit that is configured to calculate, according to the average value and the eigenvector corresponding to the current image, a relative change rate of the eigenvector corresponding to the current image, and a determining unit that is configured to capture the action behavior of the to-be-detected object in a case that the relative change rate of the eigenvector corresponding to the current image is less than a change threshold.

In an exemplary embodiment, the determining unit can include an accumulation subunit that is configured to control a counter to accumulate in a case that the relative change rate of the eigenvector corresponding to the current image is less than the change threshold, and a capture subunit that is configured to capture the action behavior of the to-be-detected object in a case that a count value of the counter exceeds an accumulation threshold.

In another exemplary embodiment, the apparatus further includes a facial recognition module that is configured to call, in a case that the to-be-detected object is a living body, the facial recognition model to perform facial recognition on an image of the to-be-detected object.

In a further exemplary embodiment, the facial recognition module includes a feature extraction unit that is configured to call the facial recognition model to perform facial feature extraction on the image of the to-be-detected object, a similarity calculation unit that is configured to perform a similarity operation of a specified facial feature according to an extracted facial feature, and a recognition result generating unit that is configured to generate a recognition result of the to-be-detected object according to an operation result.

When the living body detection apparatus provided in the foregoing embodiment performs living body detection, the division of the functional modules is merely used as an example for description. In the practical application, the functions may be distributed to and implemented by different functional modules according to the requirements, that is, an internal structure of the living body detection apparatus is divided into different functional modules, so as to implement all or some of the functions described above.

In addition, the living body detection apparatus provided in the foregoing embodiment and the embodiments of the living body detection method belong to the same idea. Specific operation manners of the modules have been described in detail in the method embodiments, and details are not described herein again.

Referring to FIG. 20, in an exemplary embodiment of this application, an electronic device 1000 can include at least one processor 1001, at least one memory 1002, and at least one communication bus 1003.

The memory 1002 stores a non-transitory computer-readable instructions, and the processor 1001 reads, by using the communication bus 1003, the computer-readable instructions stored in the memory 1002. The computer-readable instructions, when executed by the processor 1001, implement the living body detection method in the foregoing embodiments.

In an exemplary embodiment of this application, a computer-readable storage medium stores a computer program, the computer program, when executed by a processor, implementing the living body detection method in the foregoing embodiments.

The foregoing descriptions are merely exemplary embodiments of this application, and are not intended to limit the implementations of the embodiments of this application. A person of ordinary skill in the art can make corresponding modifications or variations with ease without departing from the main idea and spirit of the embodiments of this application. Therefore, the protection scope of the embodiments of this application shall be subject to the protection scope of the claims.

What is claimed is:

1. A method for liveness detection, the method comprising:
   receiving a plurality of images of a user;
   obtaining a plurality of facial feature points of the user in the plurality of images;
   determining, for each of the plurality of images of the user, a characteristic value of a facial feature of the user indicative of a respective structure of the facial feature in each of the plurality of images based on positions of the plurality of facial feature points;
   calculating an average value of the characteristic values corresponding to a subset of the plurality of images;
   determining whether an action is performed by the user based on a comparison between a relative change threshold and one or more relative changes of the characteristic values corresponding to the plurality of images with respect to the average value; and
   determining the user captured in the plurality of images is a live user based on the action being determined as performed by the user.

2. The method according to claim 1, wherein the characteristic value corresponding to the respective image indicates an aspect ratio of the facial feature that is based on the positions of the plurality of facial feature points in the respective image.

3. The method according to claim 1, wherein the determining whether the action is performed comprises:
   determining the action is performed by the user based on the relative change of the characteristic value corresponding to a current image of the plurality of images of the user with respect to the average value being less than the relative change threshold.

4. The method according to claim 1, wherein the determining, for each of the plurality of images of the user, the characteristic value comprises:
   calculating a structure distance proportion of the facial feature according to the plurality of facial feature points of the facial feature in the respective image, the characteristic value corresponding to the respective image indicating the structure distance proportion.

5. The method according to claim 1, wherein the obtaining the plurality of facial feature points comprises:
   performing grayscale processing on the plurality of images to obtain a plurality of grayscale images; and
   inputting the plurality of grayscale images into a facial key point model to obtain the plurality of facial feature points of the user in the plurality of images.

6. The method according to claim 1, wherein the facial feature includes at least one of an eye or a mouth, and the characteristic value indicates an aspect ratio of the at least one of the eye aspect or the mouth.

7. The method according to claim 1, wherein the determining whether the action is performed comprises:
   determining a number of times the relative changes of sequential images of the plurality of images is less than the relative change threshold; and
   determining that the action is performed by the user when the number of times exceeds an accumulation threshold.

8. The method according to claim 1, further comprising:
   performing authentication to verify an identity of the user when the user captured in the plurality of images is determined to be the live user.

9. The method according to claim 8, wherein the performing the authentication comprises:

performing facial recognition of the user when the user captured in the plurality of images is determined to be the live user.

10. An information processing apparatus, comprising:

processing circuitry configured to:

receive a plurality of images of a user;

obtain a plurality of facial feature points of the user in the plurality of images;

determine, for each of the plurality of images of the user, a characteristic value of a facial feature of the user indicative of a respective structure of the facial feature in each of the plurality of images based on positions of the plurality of facial feature points;

calculate an average value of the characteristic values corresponding to a subset of the plurality of images;

determine whether an action is performed by the user based on a comparison between a relative change threshold and one or more relative changes of the characteristic values corresponding to the plurality of images with respect to the average value; and determine the user captured in the plurality of images is a live user based on the action being determined as performed by the user.

11. The information processing apparatus according to claim 10, wherein the characteristic value corresponding to the respective image indicates an aspect ratio of the facial feature that is based on the positions of the plurality of facial feature points in the respective image.

12. The information processing apparatus according to claim 10, wherein the processing circuitry is configured to:

determine the action is performed by the user based on the relative change of the characteristic value corresponding to a current image of the plurality of images of the user with respect to the average value being less than the relative change threshold.

13. The information processing apparatus according to claim 10, wherein the processing circuitry is configured to:

calculate, for each of the plurality of images of the user, a structure distance proportion of the facial feature according to the plurality of facial feature points of the facial feature in the respective image, the characteristic value corresponding to the respective image indicating the structure distance proportion.

14. The information processing apparatus according to claim 10, wherein the processing circuitry is configured to:

perform grayscale processing on the plurality of images to obtain a plurality of grayscale images; and input the plurality of grayscale images into a facial key point model to obtain the plurality of facial feature points of the user in the plurality of images.

15. The information processing apparatus according to claim 10, wherein the facial feature includes at least one of an eye or a mouth, and the characteristic value indicates an aspect ratio of the at least one of the eye aspect or the mouth.

16. The information processing apparatus according to claim 10, wherein the processing circuitry is configured to:

determine a number of times the relative changes of sequential images of the plurality of images is less than the relative change threshold; and determine that the action is performed by the user when the number of times exceeds an accumulation threshold.

17. The information processing apparatus according to claim 10, wherein the processing circuitry is configured to:

perform authentication to verify an identity of the user when the user captured in the plurality of images is determined to be the live user.

18. The information processing apparatus according to claim 10, wherein the processing circuitry is configured to:

perform facial recognition of the user when the user captured in the plurality of images is determined to be the live user.

19. A non-transitory computer-readable storage medium, storing instructions which when executed by a processor cause the processor to perform:

receiving a plurality of images of a user;

obtaining a plurality of facial feature points of the user in the plurality of images;

determining, for each of the plurality of images of the user, a characteristic value of a facial feature of the user indicative of a respective structure of the facial feature in each of the plurality of images based on positions of the plurality of facial feature points;

calculating an average value of the characteristic values corresponding to a subset of the plurality of images;

determining whether an action is performed by the user based on a comparison between a relative change threshold and one or more relative changes of the characteristic values corresponding to the plurality of images with respect to the average value; and determining the user captured in the plurality of images is a live user based on the action being determined as performed by the user.

20. The non-transitory computer-readable storage medium according to claim 19, wherein the characteristic value corresponding to the respective image indicates an aspect ratio of the facial feature that is based on the positions of the plurality of facial feature points in the respective image.

* * * * *